United States Patent [19]

Kesten

[11] 4,452,116

[45] Jun. 5, 1984

[54] ASSEMBLY FOR ROTARY DIE CUTTING UTILIZING A SHAFTLESS ROLL

[75] Inventor: Martin Kesten, West Hartford, Conn.

[73] Assignee: Preston Engravers, Inc., Windsor, Conn.

[21] Appl. No.: 260,898

[22] Filed: May 6, 1981

[51] Int. Cl.$^3$ .......................... B23D 25/12; B26D 1/40

[52] U.S. Cl. .......................................... 83/346; 83/663; 83/659; 72/242

[58] Field of Search ................. 83/343, 346, 347, 495, 83/499, 505, 506, 659, 663, 348; 72/242; 144/208 B

[56] References Cited

U.S. PATENT DOCUMENTS

| | | | |
|---|---|---|---|
| 620,944 | 3/1899 | Mather . | |
| 1,148,136 | 7/1915 | Alfsen | 144/208 B |
| 1,964,893 | 7/1934 | Rohn | 72/242 |
| 3,080,898 | 3/1963 | Schnyder | 144/208 B |
| 3,299,919 | 1/1967 | Saresvuo | 144/208 B |
| 3,302,503 | 2/1967 | Hornung . | |
| 3,424,043 | 1/1969 | Martin . | |
| 3,429,166 | 2/1969 | Baker et al. | 72/242 |
| 3,566,734 | 3/1971 | Robinson | 83/663 X |
| 3,783,918 | 1/1974 | Simpson et al. | 144/208 B |
| 3,786,709 | 1/1974 | Spengler | 83/663 X |
| 4,095,498 | 6/1978 | Biggar . | |
| 4,171,655 | 10/1979 | Voorhees . | |
| 4,205,596 | 6/1980 | Chesnut . | |
| 4,220,064 | 9/1980 | Potter . | |
| 4,226,150 | 10/1980 | Reed . | |

*Primary Examiner*—Donald R. Schran

[57] ABSTRACT

Die-cutting roll assemblies are provided which utilize a shaftless die roll. In certain embodiments, stability in the press is provided by an assist adaptor which has flanged bearings that cooperatively support the die roll laterally and transversely. In other embodiments, the roll is supported in a frame that has removable centers, which permit the use of rolls of various lengths in the assembly.

21 Claims, 14 Drawing Figures

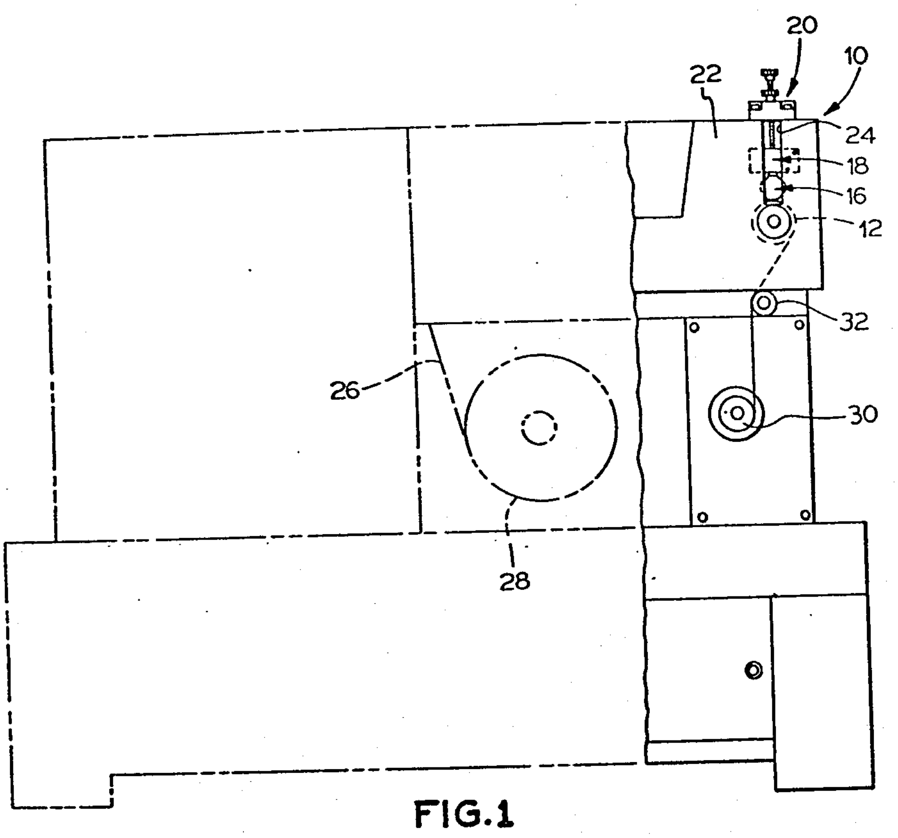
FIG.1
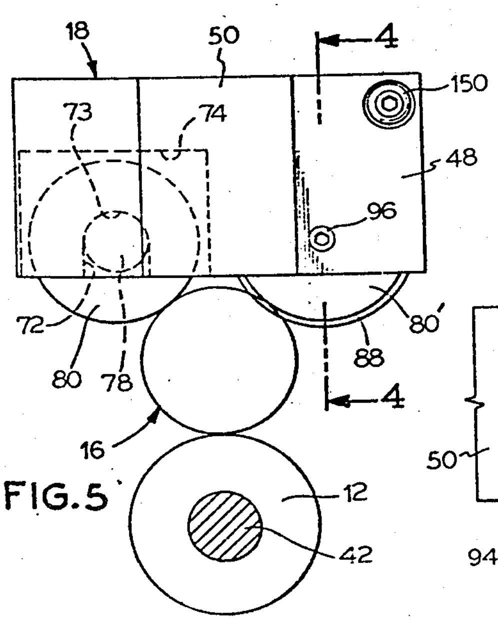
FIG.5
FIG.4
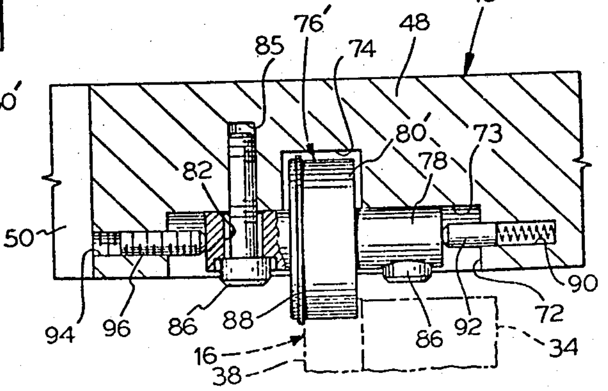

ASSEMBLY FOR ROTARY DIE CUTTING UTILIZING A SHAFTLESS ROLL

BACKGROUND OF THE INVENTION

The die rolls utilized for continuous rotary die cutting of web materials must be manufactured with a high degree of accuracy, to ensure smooth and true running in the die-cutting press and to produce work of good quality over extended periods of time. Therefore, they are quite expensive to produce. Conventionally, such die-cutting rolls have a cylindrical body portion with integrally formed axle portions extending outwardly from each opposite end; it is crucial that the axle portions, as well as the central body portion, be precisely machined to provide the necessary operating characteristics. Accordingly, a substantial part of the expense involved in manufacturing the conventional die-cutting rolls is attributable to the time, labor and materials required to produce the shaft portions.

In addition, because of the standard design utilized for such die rolls, their use tends to be limited in terms of web direction and press size. Obviously, a roll intended for relatively wide web will frequently be too long to fit into a narrow web press. Moreover, because the shaft portions will generally be of different lengths (to accommodate the drive gear on one end), considerable reworking must be carried out before they can be used in the reverse direction. Reversible die blanks are of course available, but they tend to be especially expensive, and can be used only in presses that are either originally designed or extensively modified to accommodate them.

In addition to the foregoing, standard die-cutting rolls typically fail to afford all of the convenience in use and advantageous features that might be desired. For example, installation and positioning of the die is oftentimes quite arduous, and adjustment of roll position during operation of the press is possible only with considerable difficulty, if at all. Moreover, the means by which the roll is maintained in contact with the web tends to be less than optimal, particularly insofar as load balance and roll movement and deflection are concerned. Finally, presently existing equipment of the sort here involved tends to require considerable attention for the proper lubrication of numerous wear points, and to subject the press frame and bearing members to excessive stresses, ultimately resulting in distortions and the need to replace worn parts with undue frequency.

Accordingly, it is a primary object of the present invention to provide a novel die-cutting roll assembly utilizing a modified die roll having no integrally formed shaft portions, and which is therefore relatively inexpensive to manufacture.

It is also an object of the invention to provide such an assembly in which die-cutting rolls of different lengths may readily be employed, and wherein the direction of die operation may be reversed with relative facility.

An additional object of the invention is to provide novel means by which adjustment of the lateral position of the cutting roll can readily be effected during operation of the press.

Another object of the invention is to provide novel support means for a die-cutting roll, from which standard bearing blocks are eliminated, thus reducing the lubrication requirements for the system, and by which undesirable loading upon the press and the associated mountings can be minimized.

Yet another object of the invention is to provide a novel die roll assist adaptor for use in conjunction with such a shaftless die, which adaptor facilitates initial installation and positioning of the die roll, provides a desirable mass effect to reduce bounce and shock transmission, and can be used to equalize loading upon the die.

A further object of the invention is to simply and economically provide novel apparatus having the foregoing features and advantages, the use of which requires no major modification to conventional rotary die-cutting presses.

Still further objects are to provide a novel implement for temporarily supporting the die roll upon the anvil roll during setting-up of the die-cutting station of the press, and a novel method in which the implement is employed.

SUMMARY OF THE INVENTION

It has now been found that certain of the foregoing and related objects of the invention are readily attained in an assembly adapted for mounting in a press, including a shaftless die-cutting roll and a highly rigid support member. The roll has at least one cutting element on its outer cylindrical surface, and means adjacent each of its opposite ends for rotating engagement therewith of securing means. The support member is adapted for fixed mounting adjacent the roll, and it has securing means to provide the necessary engagement with the roll, thereby cooperatively stabilizing the latter against vertical, transverse and lateral displacement in the press.

In one embodiment, the support member is adapted for mounting above the die-cutting roll, the engagement means of which roll comprises raised bearer portions disposed adjacent the ends thereof. The bearer portions provide circumferential bearing surfaces extending about the roll, as well as annular bearing surfaces at or adjacent the outer ends thereof. The securing means of the support member comprises a pair of generally cylindrical, axially aligned bearings mounted therewithin and disposed for rolling contact upon the circumferential surface of a corresponding one of the bearer portions of the die-cutting roll. Each of the bearings has a circumferential flange portion extending thereabout for abutment against the annular surface of the corresponding bearer, when in such rolling contact, thereby stabilizing the die-cutting roll against lateral displacement, as indicated.

Preferably, in this embodiment the securing means will additionally comprise a second pair of generally cylindrical bearings mounted within the support member and aligned on a second axis parallel to, and spaced transversely (normally rearwardly) from, the axis on which the first-mentioned pair of bearings is aligned. The second pair of bearings will also be disposed for rolling contact upon the circumferential surfaces of the bearer portions of the die roll, with the two pairs of the thus rectangularly disposed bearings cooperating to provide stability thereto.

Most desirably, at least four rectangularly disposed recesses will be provided in the support member to receive the bearings which contact the die roll, two of which will be aligned on each of the two axes hereinabove mentioned. It may be desirable to provide two additional recesses, which are transversely aligned with one located on each of the two defined axes. The provision of such additional recesses will permit one set of the bearings to be disposed at either of two positions that are spaced different lateral distances from another set thereof, thereby adapting the support member for use with either of two rolls of different lengths.

In a second embodiment of the assembly, the engagement means of the die-cutting roll comprises means defining a recess extending axially inwardly from each of the opposite ends thereof. The support member utilized therewith will comprise a frame extending about the roll, and the securing means will be provided by a pair of axially aligned, inwardly directed rods mounted in the frame adjacent the opposite ends of the die roll. The rods will have on their inner ends a bearing portion dimensioned and configured to engage within a corresponding one of the end recesses of the roll, to thereby journal it within the frame and cooperatively provide the desired stability in the press.

In such an assembly, the rods will advantageously be removably mounted in the frame, thereby adapting the latter to utilization with die-cutting rolls, and corresponding rods, of varying lengths. The frame may have means for biasing one of the rods inwardly, and for engaging at least one of them for axial adjustment, thus enabling ready adjustment of the lateral position of the die-cutting roll secured therebetween. Generally, the end recesses of the roll and the bearing portions of the rods will be of mated, conical configuration.

Other objects are attained by the provision of the adaptor device itself, utilizing a substantially solid block of metal with four cavities formed in its lower surface. The cavities are rectangularly disposed on two parallel, laterally extending axes, and each is dimensioned and configured to seat a bearing therewithin. The bearings are positioned for rotation about the axes of the cavities, and are adapted for rolling contact upon the circumferential surfaces of the raised bearer portions of the die-cutting roll. Both of the bearings disposed on one of the axes have circumferential flange portions extending thereabout, which are adapted to abut against annular end surfaces of the bearer portions, and thereby provide lateral stability to the roll. Generally, the two laterally extending axes will be spaced to either side of the transverse centerline of the block, and the block may have means (such as a socket) centrally disposed on its upper surface for engaging the force-transmitting member of overlying pressure means. The force applied will thereby be resolved into equal components, transmitted through the bearings to the opposite ends of the die-cutting roll.

The supporting block will preferably have biasing means and adjustment means, disposed to coact in opposite axial directions upon one of the flanged bearings, so as to permit adjustment of its axial position within the block. It may also have second biasing means acting axially (in the same direction as the first) upon the other of the flanged bearings; this may, in certain instances, be effective to ensure contact of both bearings upon the roll, and hence stable support therebetween. An axially extending adjustment member may also be threadably engaged in each end of the block and disposed to bear upon a frame portion of the press, so as to permit facile lateral registration of the block with respect thereto.

Further objects of the invention are attained by the provision of means on the support member for effecting its lateral shifting in the press during operation thereof. Broadly, the shifting means may comprise a first member affixed to the support member, and a second member adapted for affixation to the frame of the press. The first and second members will be interengaged and adjustable with respect to one another or with respect to the support member, so as to enable the desired lateral shifting to be achieved. More specifically, the first member may be threadably engaged to extend laterally into the support member, and the second member may be adapted for fixed mounting on the press. With the first and second members interengaged in a fixed relative lateral position, variation of the depth of engagement of the first member within the support member will laterally shift the suport member relative to the second member. Even more specifically, the second member will preferably comprise a slide plate disposed at one end of the support member and having a slot adjacent its outer end within which is rotatably engaged an enlarged head portion provided on the first member. Generally, a second such slide plate will be disposed within the press adjacent the opposite end of the support member, and both slide plates will be disposed thereupon. Such an assembly is adapted for use with overlying pressure means comprised of a pair of depending force-transmitting members, wherein one of the transmitting members is disposed to bear upon each of the slide plates.

Additional objects of the invention are realized by the provision of an implement for temporarily supporting the die-cutting roll in position upon the anvil roll of the press, and of a method in which it is employed. The implement comprises an end block, and a pair of parallel tines extending from one side thereof and of a length sufficient to extend and engage between both the inner and outer frame portions of the press, when the implement is properly inserted thereinto. The tines have upper surface portions dimensioned and configured to cooperatively cradle, and thereby support, the die-cutting roll thereon, and for being withdrawn laterally from therebeneath when the roll is supported by other means.

In accordance with the method, the implement is inserted laterally into the press, with the parallel tines thereof extending from the end block, laterally across and in overlying contact upon the anvil roll, and into engagement with an inner frame portion of the press. The die-cutting roll is placed between the frame portions and upon the upper surface portions of the tines, following which an assist adaptor is mounted on the press to operatively support the die-cutting roll. Finally, the implement is withdrawn from between the press frame portions, to ready the press for normal die cutting operations.

BRIEF DESCRIPTIONS OF THE DRAWINGS

FIG. 1 is a fragmentary elevational view of a rotary die-cutting press in which the assembly of the present invention is utilized;

FIG. 4 is a fragmentary sectional view of the adaptor of FIG. 3, taken along line 4—4 of FIG. 5, drawn to an enlarged scale and depicting the flanged bearing in engagement with a die-cutting roll, shown fragmentarily in phantom line;

FIG. 5 is an end elevational view of the assist adaptor of the foregoing figures, shown in engagement with a die-cutting roll which is, in turn, positioned upon an underlying anvil roll;

DETAILED DESCRIPTION OF THE ILLUSTRATED EMBODIMENTS

Figure 2:
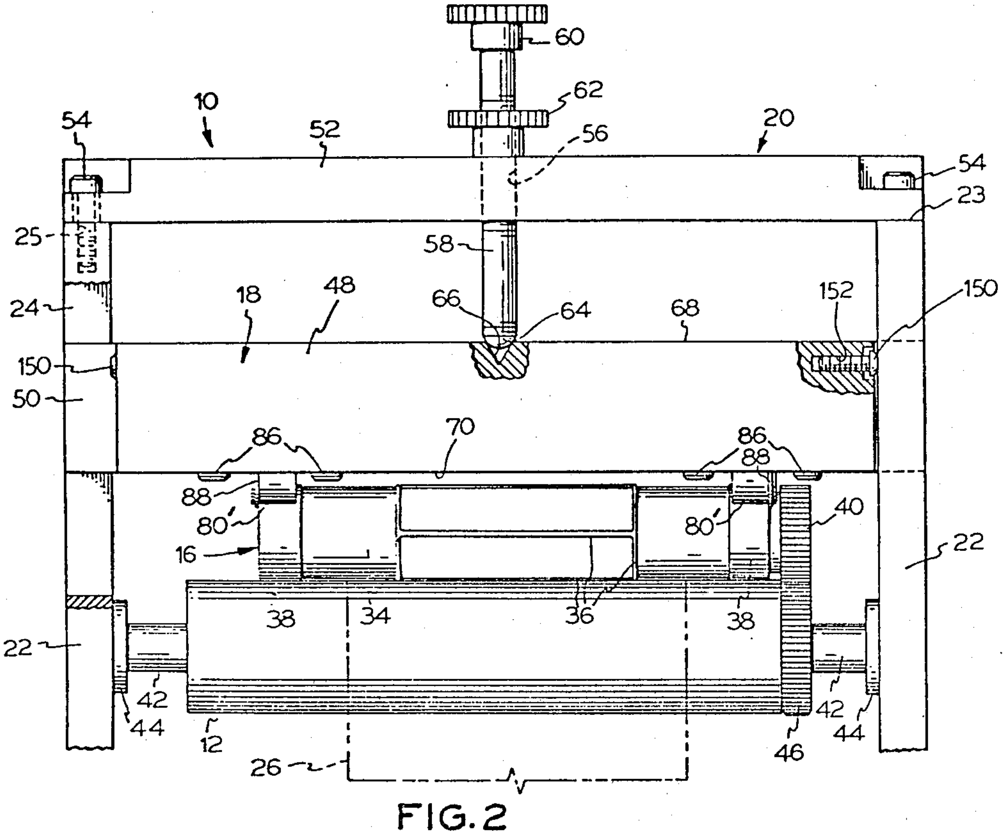
FIG. 2 is a front elevational view of the die-cutting station of the machine of FIG. 1, shown in partial section and drawn to a greatly enlarged scale.

Turning now in detail to FIG. 1 of the drawings, therein illustrated is a rotary die-cutting and printing press of the type with which the assembly of the present invention is employed, and providing a die-cutting station, generally designated by the numeral 10. The die-cutting station includes an anvil roll 12, on which is supported a die-cutting roll, generally designated by the numeral 16. Mounted above the roll 16 is an assist adaptor, generally designated by the numeral 18, over which is in turn positioned a pressure bridge assembly, generally designated by the numeral 20. The lateral frame portions 22 of the machine (on the outer one of which is visible in this Figure) are slotted at 24 to slidingly receive the assist adaptor 18 therein, and the pressure bridge assembly 20 spans the frame portions 22, and is bolted in position upon the upper edge surfaces 23 thereof. The web of material 26 to be cut is withdrawn from a supply roll 28, and the cut work is wound upon a take-up spool 30, after passing between the anvil roll 12 and the die roll 16 of the die-cutting station 10, and about an appropriate idler roll 32.

Turning now to FIG. 2 of the drawings, the die-cutting roll 16 is most fully shown therein, and is seen to have a generally cylindrical body portion 34 on which is formed cutting elements 36, and adjacent the ends of which are provided raised cylindrical bearer portions 38, with a gear portion 40 provided outwardly thereof at one end; the gear portion 40 is desirably a separate member, removably mounted (such as by bolting) thereon, so as to permit repositioning to the opposite end of the roll and thereby facile reversal of the direction of roll operation. Most significantly, it is worthy of note here that the die-cutting roll 16 is devoid of any shaft portions extending axially therefrom, such as are invariably present on conventional rolls of this sort heretofore provided. The anvil roll 12 is disposed beneath the die roll 16, and it has shaft portions 42 journaled in appropriate bearing members 44, which are in turn mounted in the frame portions 22 of the press. The anvil roll 12 has a gear element 46 adjacent one end, which is in meshing engagement with the gear portion 40 of the die roll 16. As will be appreciated, the anvil roll 12 is driven through an appropriate drive train by the motor of the press (neither of which is shown), and the die-cutting roll 16 is in turn driven thereby through engagement of the gear portions 40, 46.

Mounted above the roll 16 is the assist adaptor 18, which will be described in detail hereinbelow. Suffice to say here that the body 48 of the adaptor 18 has a vertically oriented tongue 50 projecting outwardly from each of its ends, which is slidably received in the corresponding slot 24 formed in the adjacent frame portion 22 of the press.

The bridge assembly 20 includes a crosspiece 52 which extends between the frame portions 22 and is bolted to the upper edges 23 thereof by suitable fasteners 54, engaged in threaded holes 25. The crosspiece 52 has a threaded aperture 56 centrally disposed thereon and extending therethrough, in which is engaged the threaded shaft 58 of a hold-down screw. The upper end of the shaft 58 has a knob 60 affixed thereto, and a locking nut 62 is spaced thereon downwardly from the handle 60. The lower end of the shaft is configured to provide a hemispherical tip portion 64, which is engaged in the conical recess 66 formed into the upper surface 68 of the block 48. As will be appreciated, the tip 64 and recess 66 are configured for secure interengagement, permitting downward force to be applied through the screw to the adaptor 18. This is, of course, accomplished by turning the knob 60 to advance the shaft 58 in the aperture 56, with the nut 62 being utilized to maintain the proper position by subsequent tightening against the crosspiece 52. As will also be appreciated, by appropriately locating the recess 66 the force applied may be balanced and transmitted equally both transversely and laterally therethrough.

Figure 3:
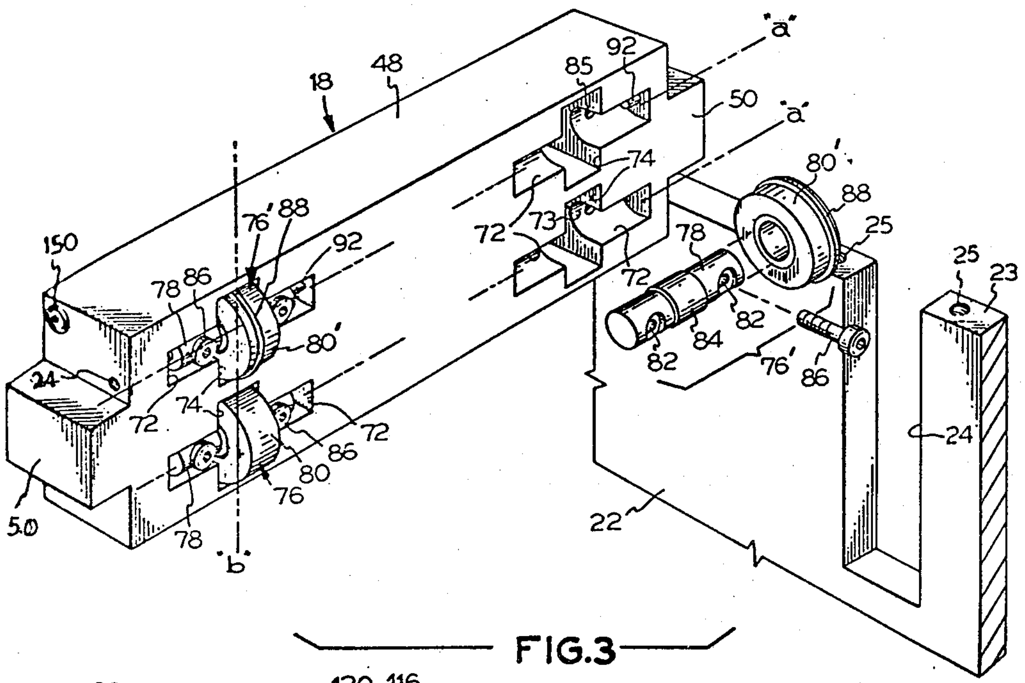
FIG. 3 is an exploded perspective view of a die assist adaptor embodying the present invention, with one of the bearing assemblies removed therefrom, and showing a portion of the press frame in which it may be mounted.

The construction of the die assist adaptor 18 is most clearly illustrated in FIGS. 3 and 4, from which it can be seen that four substantially identical, compound cavities are formed into the lower surface 70 of the body 48 thereof. Each cavity consists of a longitudinally extending, relatively shallow slot 72 having a curved innermost wall portion 73, and a relatively deep transversely extending central portion 74 intermediate the ends of the slot 72. Alignment of each of the compound cavities on one of two parallel longitudinal axes "a" and transverse axes "b" causes the four cavities to be rectangularly disposed in the block 48; the recess 66 is desirably located at the intersection of diagonals between the cavities.

Each of the bearing assemblies, generally designated by the numeral 76, 76', consists of a short axle 78 and a cylindrical bearing 80, 80'. The axles 78 have countersunk oval apertures 82 adjacent both ends, and an enlarged cylindrical portion 84 therebetween. As will be appreciated, the bearings 80, 80' are assembled with the axles 78, and are affixed thereon (such as by press-fitting) against relative axial movement; however, the bearings 80, 80' will, of course, rotate due to their inherent construction. The bearing assemblies 76, 76' are seated in the cavities of the block 48, with the end portions of their axles 78 supported against the arcuate surfaces 73 of the slots 72. A threaded opening 85 extends thereinto on each side of the section 74, to receive a machine screw 86, which passes through the corresponding apertures 82 of the axle. The circumferential flanges 88 extending about the two bearings 80' serve a fundamental and essential function in certain embodiments of the invention, as will be discussed in detail hereinbelow.

A spring-loaded finger 92 projects from a short bore 90 provided at one end of each of the slots 72 of the two forward cavities in the assist adaptor block 48, and bear upon the adjacent ends of the axles 78 of the bearing assemblies 76' seated therein. Threaded aperture 94 extends inwardly from the opposite end of one of the slots 72, and has engaged therein a small adjustment screw 96. Advancement of the screw 96 in the aperture 94 will urge the associated bearing assembly 76' inwardly against the force of the spring-loaded finger 92, in turn causing the die-cutting roll 16 to shift axially, through engagement of the circumferential flange 88 thereupon. The other bearing assembly 76' will also be shifted against its associated finger 92, by virtue of engagement of its flange 88 with the opposite end of the roll. The oval cross-section of the apertures 82 extending through the axles 78 serves, of course, to accommodate the movement necessary for such adjustment.

The manner in which the adaptor 18 is employed to cooperatively support the die-cutting roll 16 is most readily appreciated by reference to FIGS. 2–5, and in particular to FIG. 2. As seen therein, the die roll 16 is supported directly upon the underlying anvil roll 12, with their respective gear portions 40, 46 in meshing engagement, as previously indicated. The assist adaptor 18 is installed in the machine on top of the die roll 16, by engaging the tongue portions 50 thereof within the vertical slots 24 in the frame portions 22, and lowering it into direct contact with the roll 16. In that position, all four of the bearings 80, 80' have their cylindrical surface portions in contact with the bearer portions 38 of the die roll 16, with the forwardmost bearings 80' disposed in front of the centerline of the roll 16 and with the rearmost bearings 80 disposed therebehind. Consequently, the bearings 80, 80' cooperate with the anvil roll 20 to provide what may be regarded as a triangulated support system (considered in a vertical sense), thus stabilizing the roll 16 vertically and transversely (i.e., from font to rear), as well as against twisting about a vertical axis therethrough. For this purpose, it is important that the laterally extending axes on which the bearings are mounted be spaced a distance sufficient to provide adequate stabilization, which will, of course, depend to an extent upon the diameter of the die roll with which the adaptor is used.

As has been described above, when the cylindrical surfaces of the bearings 80' are in contact with the corresponding cylindrical surfaces of the bearers 38, the inner surfaces of the flanges 88 also engage the outer end faces thereof, thereby providing lateral stability to the roll 16. It is however to be noted that, if otherwise unrestrained the die-cutting roll will often have a natural tendency to drift laterally, in one direction or the other, during operation of the press. Consequently, lateral stability will be essentially the result of contact with only one of the bearings 80', functioning essentially in the nature of a thrust member. Since the direction of such roll movement will, however, change depending upon inherent but generally unpredictable factors, it will in most instances be necessary to provide a flanged bearing at each end of the adaptor, as illustrated. It will also be appreciated that, in those instances in which appropriate spring loading is provided for the bearing assemblies 76', lateral contact may be ensured despite the fact that the roll 16 may be moving away from it.

As best seen in FIGS. 2 and 5, alignment screws 150 are provided at the opposite ends of the block 48, received in threaded bores 152. By appropriate adjustment of the screws 150, further control may be afforded over the lateral position of the adaptor 18 within the press. Other means may be provided to serve this function; indeed, the means used will preferably be such as to permit adjustments to be made while the press is in operation, and a suitable mechanism for that purpose will be more fully described hereinafter with reference to FIGS. 11 through 14. As another example, however, an eccentric washer, that is capable of being locked in any of its rotated positions, may be secured to the front of the block adjacent one or both of its ends, with its edge disposed to contact the adjacent frame portion of the press. By rotating the washer or washers, the adaptor 18 may thereby be urged in one or the other direction, while the press is running.

Because of its weight, the body 48 of the assist adaptor 18 will, in-and-of itself, serve to some extent to maintain the desired downward force upon the die-cutting roll 16. Thus, it will most desirably have a relatively large mass, to minimize bouncing of the roll 16, which would tend to produce uneven cutting and a loss of quality in the work. The body 48 will also be fabricated so as to exhibit a high level of rigidity, to ensure a balanced distribution of force to the roll 16. This is especially important when the force-applying member is one of single-point contact, as in the case of the illustrated bridge assembly 20.

Figure 7:
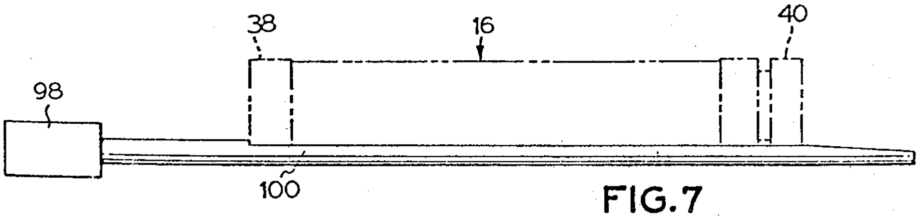
FIG. 7 is a front elevational view of the implement of FIG. 6, in position to provide stabilizing support for a die-cutting roll, shown in phantom line.
Figure 6:
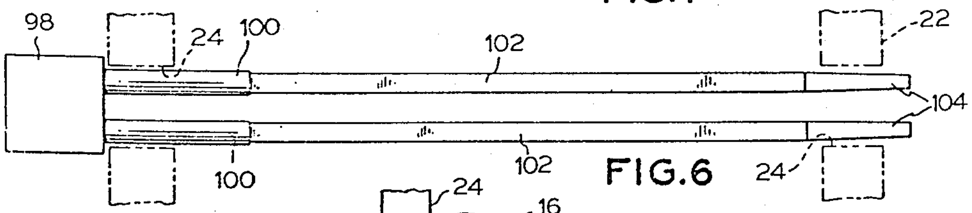
FIG. 6 is a plan view of a fork-like implement utilized to provide temporary support for the die roll during the mounting procedure, the implement being shown engaged between frame portions which are illustrated in phantom line.
Figure 8:
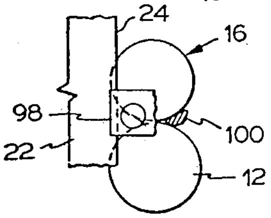
FIG. 8 is a left-end elevational view of the implement of the foregoing figures, positioned for temporary support for the roll.

Because the die roll 16 is in rolling contact with the anvil roll 12, it will not remain in position in the absence of added support. This makes it difficult for one person to set up the die-cutting station 10, because he would have to manipulate the adaptor 18 with one hand while holding the roll 16 with the other, and the weight of the adaptor makes unassisted, one-handed manipulation unfeasible. Accordingly, the device shown in FIGS. 6–8 is advantageously employed to assist installation of the die roll into the press.

The fork-like implement shown consists of an end block 98, and a pair of parallel tines 100 extending therefrom. The upper surfaces of the tines 100 are configured to have an arcuate cross-section throughout a major portion 102 of their length, so as to cradle the roll 16 therebetween and thereby prevent it from rolling off the anvil roll. As best seen in FIG. 6, the implement is utilized by inserting it laterally into the slots 24 of the frame portions 22 of the machine, so as to extend thereacross and be securely mounted thereby, and the tip portions 104 of the tines may be relieved slightly to accommodate the somewhat greater diameter of the gear portion 40. After the assist adaptor 18 has been mounted on the machine and in engagement with the roll 16, the supporting implement is no longer necessary, and may be removed; this is done simply by withdrawing it laterally from between the slots 24.

Figure 10:
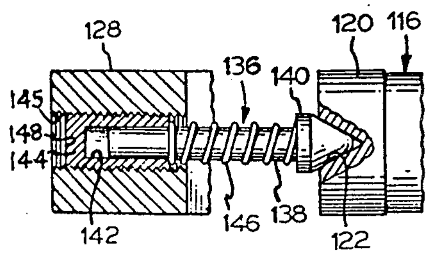
FIG. 10 is a fragmentary view of the left end of the assembly of FIG. 9, in partial vertical section and drawn substantially to the scale thereof.
Figure 9:
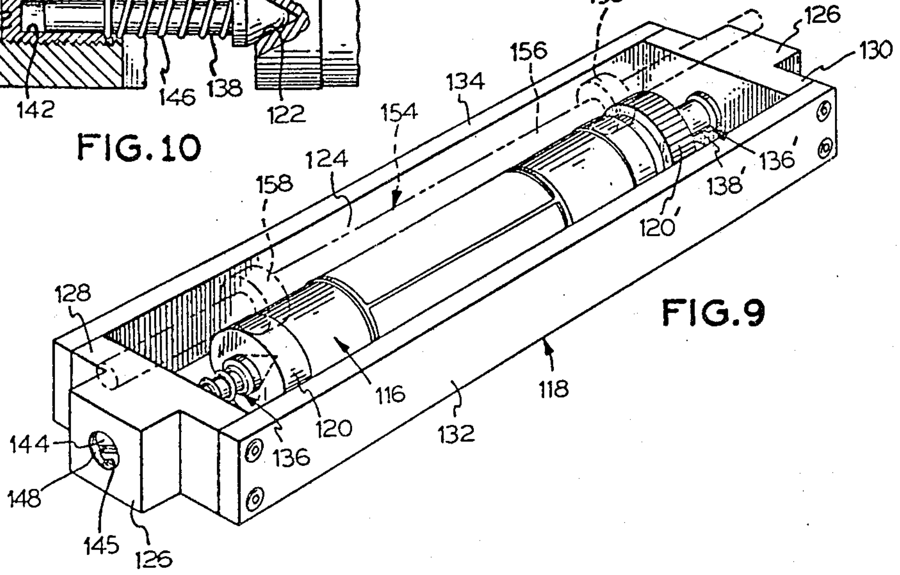
FIG. 9 is a perspective view of a second embodiment of the assembly of the present invention, showing a die-cutting roll supported within a rigid frame member and showing a hold-down roll in phantom line.

Turning next to FIGS. 9 and 10, a second embodiment of a die-cutting roll assembly embodying the present invention is illustrated, and again consists of a shaftless die, generally designated by the numeral 116, and a support member or frame, generally designated by the numeral 118. The parts of the roll 116 are substantially the same as those of the roll 16 described with reference to the foregoing Figures, and accordingly further description thereof would be quite superfluous. However, it is important to note here that the end portions 120, 120′ of the roll 116 are provided with conical recesses 122, by which the roll 116 is mounted within the frame 118. The construction described is best seen with reference to FIG. 10, and it will be appreciated that, although only end 120 of the roll is shown, the opposite end 120′ will also be provided with an axial recess, formed, however, in the gear portion. It will also be appreciated that the roll 16 of the foregoing Figures and roll 116 may be one and the same, and that both ends of the roll itself will be configured to receive a center if the gear is to be removable for reversal of roll direction, as described.

As was true of the block 18, the frame 118 is of highly rigid construction, albeit that it provides a large rectangular opening 124 within which the die roll 116 is received; the frame 118 similarly has tongue portions 126 at each of its ends, so as to adapt it for slideable mounting within the frame portions 22 of the machine, in a manner comparable to that in which the assist assembly 18 is supported. The tongue portions 126 project from the relatively short end pieces 128, 130, which are in turn rigidly secured to relatively long front and rear pieces 132, 134, respectively. Extending axally inwardly from each of the end pieces 128, 130 is a rod or center, generally designated by the numerals 136, 136′, which engage the opposite ends of the roll 116.

More particularly, as best seen in FIG. 10, the center 136 consists of a shank 138, on the forward end of which is provided a conical nose portion 140. The latter is securely engaged in the conical recess 122 provided in the corresponding end portion 120 of the roll 116, and it is dimensioned and configured to closely mate therewith; the contacting surfaces will, of course, normally be machined and polished to a high degree of smoothness, so as to permit free and relatively frictionless rotation of the roll. The shank 138 of the center 136 is slideably received in the bore 142 of an externally threaded adaptor 144, which is in turn engaged within the associated end piece 128. A coil spring 146 is compressed between the rear surface of the head 140 and the front surface of the adaptor 144, causing the center 136 to be urged to an extended position. In this manner, the center 136 is spring-loaded to maintain an appropriate level of axial force upon the die roll 116. The adaptor 144 has an end slot 148 to permit engagement of a screwdriver, to change the axial position of the adaptor 144; this may be to accommodate rolls of different lengths, or to adjust the amount of biasing force applied thereto.

Although not illustrated in detail, it will be appreciated that the center 136′ disposed at the opposite end of the frame 118 has a shank 138′ which is itself threaded, again to permit facile alteration of the effective lengths of the center 136′, for positioning of the roll 116 within the frame 118. While preferred, spring loading is, of course, optional, and in any event it is not necessary to provide that feature at both ends of the roll; biasing at one end, and adjustability at the other, will generally suffice.

It should be understood that, although support for the roll 116 is provided in all directions by the frame 118, its primary function is to stabilize against lateral and transverse displacement; vertical support will normally be provided by suitable hold-down means. In FIG. 9, the roll, generally designated by the numeral 154, of a suitable hold-down assembly is illustrated, and consists of a shaft 156 on which is affixed a pair of rollers 158. As can be seen, the rollers 158 bear directly upon the bearers (not specifically numbered in this figure) of the die roll 116. Downward force upon the roll 154 can, in turn, appropriately be produced from a bridge-like device such as the assembly 20 of FIG. 2, utilizing (as is common for such bridges) a pair of clamping screws acting upon bearing blocks in which the ends of the shaft 156 are journaled.

With reference now to FIGS. 11 through 14, a further embodiment of the assist adaptor is illustrated, as is means by which the lateral position of the adaptor in the press can be adjusted during operation thereof. To a large extent, the parts shown are identical to those illustrated in figures previously discussed in detail; those parts will be given like numbers, and will not necessarily be further addressed specifically.

Figure 13:
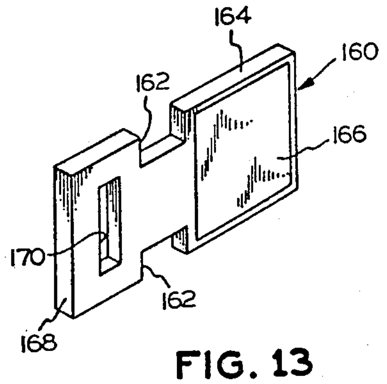
FIG. 13 is a perspective view of the slide plate comprising the adjustment means employed in the embodiment of two previous figures.
Figure 14:
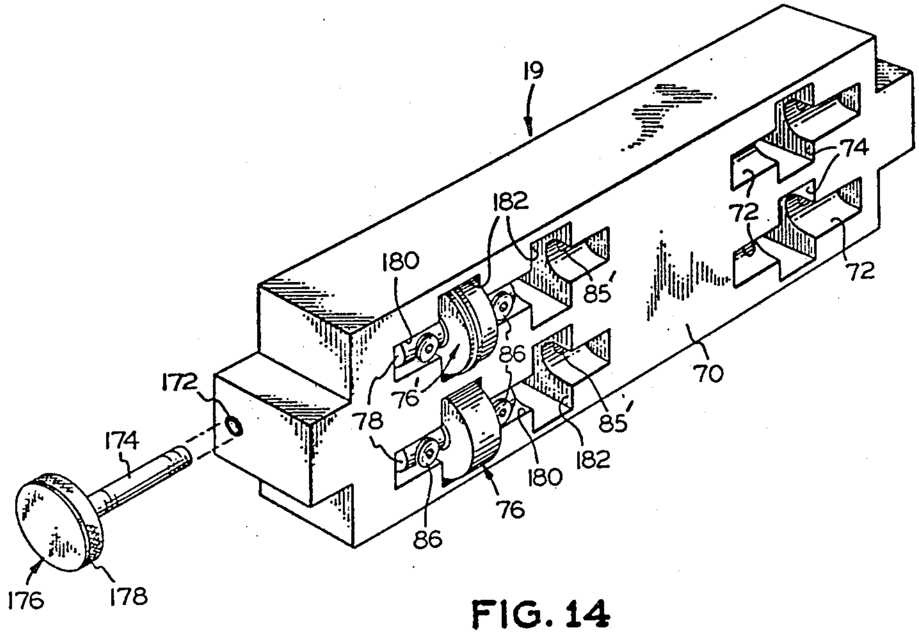
FIG. 14 is a perspective view of the assist adaptor of those figures, with the thumb screw thereof removed from its threaded bore.

Disposed on the upper surface of the block 48 of the adaptor 19 are a pair of slide plates, generally designated by the numerals 160, 160′. As best seen in FIG. 13, each of the plates 160, 160′ has a U-shaped indentation 162 in each side thereof, by which it is fixedly engaged within the slots 24 provided at the opposite sides of the press frame. The larger portion 164 of each plate carries on its undersurface a pad 166 of low-friction material, such as may be made of DuPont Teflon. The distinction between the two slide plates resides in the fact that plate 160 has formed through its smaller end portion 168 a tapered slot 170, the purpose for which with be discussed in detail presently (while such a slot could also be present in the slide plate 160′, so as to avoid the need for providing plates of different construction, normally it would serve no purpose).

Figure 12:
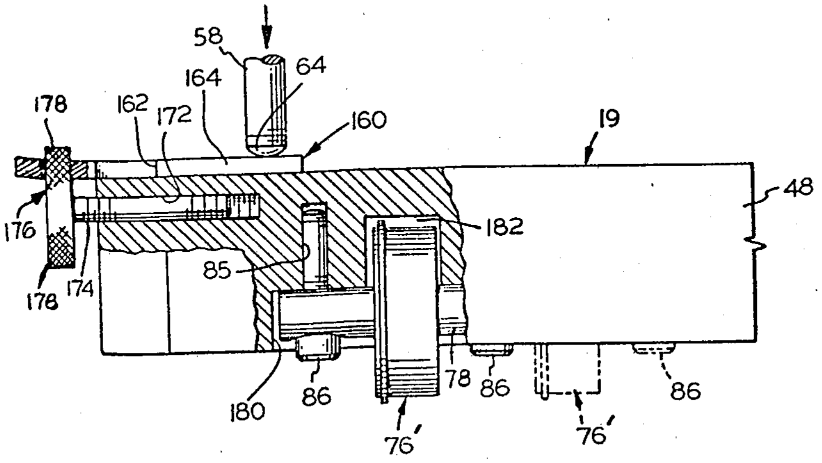
FIG. 12 is a fragmentary front elevational view, in partial section, of the assist adaptor and adjustment means utilized in the assembly of FIG. 11.

As best seen in FIG. 12, the left end of the block 48 has an axially or laterally extending threaded bore 172 formed therein, within which is received the threaded shaft 174 of a thumb screw, generally designated by the numeral 176. The thumb screw 176 has a knurled enlarged head 178, which is received in the slot 170 of the slide plate 160. As will readily be appreciated, turning the thumb screw 176 to alter its axial position within the bore 172 will effect lateral shifting of the block 48, in view of the fact that the slide plate 160 is rigidly affixed within the press. Because of the convenient location of the thumb screw 176 it is readily accessible, thus permitting adjustment of the assist adaptor 19 and, in turn, of the lateral position of the die-cutting roll 16, while the press is in operation.

Figure 11:
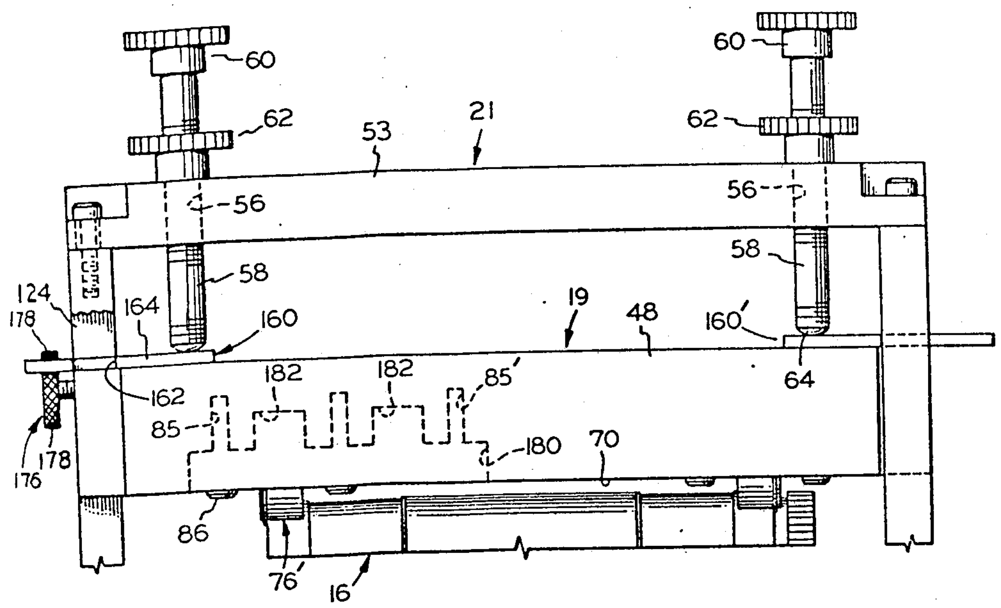
FIG. 11 is a fragmentary front elevational view of the machine die-cutting station, comparable to FIG. 2 and showing alternative embodiments of the assist adaptor and of the hold-down means.

With further reference to FIG. 11, it can be seen that the bridge assembly 21 employed in the modified embodiment illustrated differs from that of FIG. 2 primarily by virtue of the utilization of two hold-down screws adjacent the opposite ends of the crosspiece 53, rather than utilizing only a single such screw in a sentral position. Consequently, the crosspiece 53 has two threaded apertures 56, in which is engaged the threaded shaft 58 of a hold-down screw. An appropriate handle 60 and locking nut 62 is provided on each of the screws, and the lower ends 66 thereof bear upon the upper surface of the associated slide plate 160, 160′. In this manner, appropriate force is transmitted to the opposite ends of the assist adaptor 18, by suitable adjustment of the two hold-down screws.

The assist adaptor 19 is modified by the provision of modified compound cavities, which are formed in the lower surface 70 of the body 48 thereof. In this embodiment, the two cavities at the left-hand end of the body 48 consist of slots 180 which are elongated, as compared to the slots 72 shown in FIG. 3. In addition, each of the slots 180 is intersected by two relatively deep transversely extending central portions 182, adapted to receive one of the bearing assemblies 76, 76'. An additional threaded opening 85' is provided adjacent the innermost ends of the slots 180 to receive the machine screws 86, which pass through suitable apertures (not visible) of the axles 78 on which the bearings 80 are mounted (in this instance, however, the apertures may be truly circular, since there is no need for shifting of the axles 78 relative to the screws 86). As will be appreciated, the provision of compound slots so configured the bearing assemblies 76, 76' may be disposed in either of two laterally disposed positions, thus readily enabling use of the adaptor 19 with either of two die-cutting rolls of substantially different lengths; the alternative position of the bearings 76, 76' (only the forward-most bearing 76' being visible) is shown in FIG. 12).

Thus, it can be seen that the present invention provides a novel die-cutting roll assembly, utilizing a modified die roll having no integrally formed shaft portions. Consequently, the die roll can be produced less expensively than a conventional roll of the same size, and the longer the shaft portions would have been, the greater the amount of the savings realized. Die-cutting rolls of different lengths may readily be employed in the assembly, means for adjusting the lateral position of the roll during operation of the press may be provided, and the design of the rolls enables reversal of the direction of die operation with relative facility. The invention also provides novel support means for a die-cutting roll, from which standard bearing blocks are eliminated, thus reducing the lubrication requirements for the system and minimizing undesirable loading upon the press and the associated mountings. More particularly, a die roll assist adaptor is furnished for use in conjunction with a shaftless die, which adaptor facilitates initial installation and positioning of the die roll, provides a desirable mass effect to reduce bounce and shock transmission, and can be used to equalize loading upon the die. The invention further provides a novel implement for temporarily supporting the die roll upon the anvil roll during setting-up of the die-cutting station of the press, as well as a novel method in which the implement is employed. The apparatus of the invention is relatively simple and economical to use and produce, and no major modification to conventional rotary die-cutting presses is entailed.

Having thus described the invention, what is claimed is:

1. In a press, a die-cutting roll assembly comprising: a substantially solid shaftless die-cutting roll having at least one cutting element on its outer cylindrical surface, having means for mounting a gear portion on one end thereof, and having a raised bearer portion disposed adjacent each of its opposite ends and extending circumferentially thereabout; and an adaptor device mounted in the press above and in direct contact with said die-cutting roll, said device comprising a highly rigid, substantially solid block of relatively large mass having means for mounting it in the press, four generally cylindrical bearings rectangularly disposed on said block on two parallel, laterally extending axes, said bearings being mounted for rotation about said axes with their circumferential surface portions lying beyond the lower surface of said block and in rolling contact upon the circumferential surfaces of said raised bearer portions of said die-cutting roll, and means on said device extending downwardly into contact with at least one end surface of said die-cutting roll for providing lateral stability thereto.

2. The assembly of claim 1 wherein said block has at least four recesses formed into said lower surface thereof, within which said bearings are mounted.

3. The assembly of claim 1 wherein both of said bearings on one of said axes has a circumferential flange portion extending thereabout providing said end surface contacting means of said adaptor device.

4. The assembly of claim 1 wherein said block has biasing and adjustment means therein with elements disposed to coact in opposite axial directions upon one of said bearings for controlling the axial position of said one bearing within said block.

5. The assembly of claim 1 wherein said block has means disposed on its upper surface for engaging the force-transmitting member of overlying pressure means and for resolving the force applied thereby into equal components for transmission through said bearings to said bearer portions at said opposite ends of said roll.

6. The assembly of claim 5 wherein said engaging means comprises a socket formed in said upper surface.

7. The assembly of claim 1 additionally including means for laterally shifting said block in the press during operation thereof.

8. The assembly of claim 7 wherein said shifting means comprises a first member affixed to said block, and a second member adapted for affixation to the frame of the press, said first and second members being interengaged and adjustable with respect to one another or with respect to said block, to effect lateral shifting thereof relative to the press.

9. The assembly of claim 8 wherein said first member is threadably engaged to extend laterally into said block, and wherein said second member is adapted for fixed mounting on the press, said interengagement therebetween maintaining said first and second members in a fixed relative lateral position, so that variation to the depth of engagement of said first member within said block will laterally shift said support member relative to said second member.

10. The assembly of claim 9 wherein said second member comprises a slide plate disposed at one end of said block nd having a slot adjacent its outer end, and wherein said first member has an enlarged head portion rotatably engaged within said slot of said plate.

11. The assembly of claim 10 additionally including a second slide plate adapted to be disposed within the press adjacent the opposite end of said block, said slide plates being adapted to overlie said block and said assembly being adapted for use with overlying pressure means of the press comprising a pair of depending force-transmitting members.

12. An adaptor device for fixed mounting in a press above a die-cutting roll for the stabilizing engagement thereof, comprising in combination: a highly rigid, substantially solid block of relatively large mass adapted for mounting in a press; four generally cylindrical bearings rectangularly disposed on said block on two parallel, laterally extending axes, mounted for rotation about said axes with their circumferential surface portions lying beyond the lower surface of said block for rolling contact upon the circumferential surfaces of raised bearer portions of an underlying adjacent die-cutting roll; and downwardly extending means for contacting an end surface of the die-cutting roll, to provide lateral stability thereto.

13. The device of claim 12 wherein said axes are spaced to either side of the transverse centerline of said block.

14. The device of claim 13 wherein said one axis is spaced forwardly of said centerline.

15. The device of claim 13 wherein said block has an axially extending adjustment member threadably engaged in each end thereof and disposed to bear upon a frame portion of the press, said adjustment members being adjustable for lateral registration of said block with respect to the press.

16. The device of claim 13 wherein said block has means disposed on its upper surface for engaging the force-transmitting member of overlying pressure means and for resolving the force applied thereby into equal components for transmission through said bearings to the bearer portions at the opposite ends of the die-cutting roll.

17. The device of claim 16 wherein said engaging means comprises a socket formed in said upper surface.

18. The device of claim 12 wherein both of said bearings on one of said axes has a circumferential flange portion extending thereabout providing said end surface contacting means.

19. The device of claim 18 wherein said block has at least four recesses formed into said lower surface thereof within which said bearings are mounted.

20. The device of claim 18 wherein said block has biasing and adjustment means therein with elements disposed to coact in opposite axial directions upon one of said flanged bearings for controlling the axial position of said one bearing within said block.

21. The device of claim 20 wherein said block has a biasing member therein acting axially, in the same direction as the biasing element of said biasing and adjustment means, upon the other of said flanged bearings.

* * * * *